US009988308B1

(12) United States Patent
Lupien et al.

(10) Patent No.: US 9,988,308 B1
(45) Date of Patent: Jun. 5, 2018

(54) EPOXY BASED MATERIAL AND APPLICATIONS THEREFORE

(71) Applicant: Five Star Products, Inc., Shelton, CT (US)

(72) Inventors: Steven C. Lupien, Trumbull, CT (US); Zbigniew Andrew Szczepaniak, Middletown, CT (US); Douglas A. Cheney, Waterbury, CT (US)

(73) Assignee: FIVE STAR PRODUCTS, INC., Shelton, CT (US)

( * ) Notice: Subject to any disclaimer, the term of this patent is extended or adjusted under 35 U.S.C. 154(b) by 0 days. days.

(21) Appl. No.: 15/587,175

(22) Filed: May 4, 2017

Related U.S. Application Data

(60) Provisional application No. 62/332,324, filed on May 5, 2016.

(51) Int. Cl.
| C04B 26/14 | (2006.01) |
| E01C 11/00 | (2006.01) |
| E01C 7/30 | (2006.01) |
| E01C 23/06 | (2006.01) |
| C04B 111/00 | (2006.01) |

(52) U.S. Cl.
CPC ............... C04B 26/14 (2013.01); E01C 7/30 (2013.01); E01C 11/005 (2013.01); E01C 23/06 (2013.01); *C04B 2111/0075* (2013.01)

(58) Field of Classification Search
CPC ... C04B 26/14; C04B 2111/0075; E01C 7/30; E01C 11/005; E01C 23/06
USPC .............................................. 404/17, 72, 75
See application file for complete search history.

(56) References Cited

U.S. PATENT DOCUMENTS

| 3,161,114 | A | * | 12/1964 | Wittenwyler | B05D 5/08 404/19 |
| 3,494,889 | A | * | 2/1970 | Edwards | C08G 59/623 528/99 |
| 4,185,132 | A | * | 1/1980 | Gurney | C08G 59/1438 404/12 |
| 4,230,814 | A | * | 10/1980 | Crivello | C08G 59/687 430/280.1 |
| 4,511,701 | A | * | 4/1985 | Ryang | C07F 7/0854 525/487 |
| 4,582,886 | A | * | 4/1986 | Ryang | C07F 7/0854 525/474 |
| 4,744,693 | A | * | 5/1988 | Smith | E01C 11/005 404/77 |
| 6,342,577 | B1 | * | 1/2002 | Konarski | C08G 59/4014 257/E21.503 |

(Continued)

OTHER PUBLICATIONS

ASTM International, Standard Test Method for Tensile Properties of Plastics, Designation: D638, 2010.

(Continued)

*Primary Examiner* — Raymond W Addie
(74) *Attorney, Agent, or Firm* — Day Pitney LLP

(57) ABSTRACT

A composition of matter includes: a first composition and a second composition configured to react with each other and provide an epoxy-based binder system; and aggregate for being disbursed into the binder system to provide a material; wherein a moisture content of the aggregate is controlled according to a desired strength for cured material. A method of application of the resulting epoxy based material is disclosed.

28 Claims, 4 Drawing Sheets

(56) References Cited

U.S. PATENT DOCUMENTS

| | | | | |
|---|---|---|---|---|
| 6,632,893 B2* | 10/2003 | Konarski | ............ | C08G 59/4014 |
| | | | | 257/793 |
| 2011/0129296 A1* | 6/2011 | Van Velsor | ......... | B01F 13/0013 |
| | | | | 404/79 |
| 2012/0259040 A1* | 10/2012 | Schroetz | .............. | C08G 59/184 |
| | | | | 523/400 |
| 2014/0348776 A1* | 11/2014 | Palmer, Jr. | ............. | C09D 7/001 |
| | | | | 424/78.09 |
| 2015/0299378 A1* | 10/2015 | Chen | .................. | C08G 59/5033 |
| | | | | 523/400 |
| 2016/0130769 A1* | 5/2016 | Giles | ..................... | E01C 11/005 |
| | | | | 404/75 |

OTHER PUBLICATIONS

ASTM International, Standard Test Method for Compressive Strength of Hydraulic Cement Mortars (Using 2-in. or [50-mm] Cube Specimens), Designation: C109/C109M, 2011.

ASTM International, Standard Test Methods for Vulcanized Rubber and Thermoplastic Elastomers-Tension, Designation: D412-06a, Reapproved 2013.

\* cited by examiner

-- PRIOR ART --

-- PRIOR ART --

-- PRIOR ART --

EPOXY BASED MATERIAL AND APPLICATIONS THEREFORE

CROSS REFERENCE TO RELATED APPLICATION

This application is filed under 35 U.S.C. § 111(a) and further, under 35 U.S.C. § 119(e) claims the benefit of U.S. provisional patent application Ser. No. 62/332,324, filed May 5, 2016 and entitled "Epoxy Based Material and Applications Therefore."

BACKGROUND OF THE INVENTION

1. Field of the Invention

The invention disclosed herein relates to repair of roadway surfaces, and in particular, to compositions of matter and methods for performing the repairs.

2. Description of the Related Art

Modern roadways are subject to constant use and must withstand extreme conditions. Thus, road surfaces are engineered to withstand substantial and variable loads, as well as a wide range of environmental conditions. Even with thoughtful design and construction, road surfaces inevitably degrade over time.

A common failure mode involves stress cracking of pavement with subsequent water penetration. This can result in erosion of base layers, further weakening the surface above. With the continuing loading from above, the surface may ultimately fail and a "pothole" results.

As many drivers know, potholes are a particular problem in the later Winter and early Spring. That is, when thaw and freeze cycles occur frequently, water can migrate under the road surface and then freeze. The volumetric expansion resulting from the freezing of the water often deforms the road surface further, also causing potholes.

Potholes can be particularly hazardous on well-traveled roads. Damage and potential incapacitation of a vehicle that has hit a pothole is a common result. In heavy traffic, this can cause accidents or substantial delays. Thus, care of the roadways often calls for temporary repairs including filling and patching of potholes.

Conventional temporary repairs often call for simply filling each pothole with additional pavement material. Most often, this involves filling of each pothole to the level of the roadway by hand. Typically, the patch is not adequately compressed into place as it is not practicable to bring suitable heavy equipment to each repair location.

While this type of repair eliminates immediate hazards, such repairs usually do not last. That is, such repairs do not restore the underlayment to an as-built condition. For example, the pavement is not laid with the same density (i.e., limited porosity). Accordingly, residual water or moisture within a pothole may perpetuate the cycle, while additional water may penetrate the patch. Ultimately, the only effective repair for a roadway with multiple potholes is milling of the roadway to remove the pavement with a subsequent complete resurfacing.

What are needed are methods and apparatus to provide improved repairs to roadway surfaces. Preferably, the methods and apparatus result in repairs that exhibit robust durability under the range of conditions common to a road surface, and are simple to apply.

SUMMARY OF THE INVENTION

In one embodiment, a composition of matter is provided. The composition of matter includes: a first composition and a second composition configured to react with each other and provide an epoxy-based binder system; and aggregate for being disbursed into the binder system to provide a material; wherein a moisture content of the aggregate is controlled according to a desired strength for cured material.

The first composition may include: 4,4'-isopropylidene-diphenol-epichlorohydrin copolymer; phenol-formaldehyde polymer glycidyl ether; and monofuctional epoxy reactive diluent. The weight percent of 4,4'-isopropylidenediphenol-epichlorohydrin copolymer may be provided in range of between 60 to 80. The weight percent of phenol-formaldehyde polymer glycidyl ether may be provided in range of between 10 to 30. The weight percent of monofuctional epoxy reactive diluent may be provided in range of between 5 to 15.

The second composition may include: styrenated phenol; aminoethylpiperazine; an aromatic diluent; naphtalene, bis(1-methylethyl)-; a tertriary amine; and an aliphatic amine. The weight percent of styrenated phenol may be provided in range of between 35 to 60. The weight percent of aminoethylpiperazine may be provided in range of between 15 to 30. The weight percent of aromatic diluent may be provided in range of between 10 to 20. The weight percent of naphtalene, bis(1-methylethyl)- may be provided in range of between 5 to 15. The weight percent of triethanolamine may be provided in range of between 0 to 10. The weight percent of aliphatic amine may be provided in range of between 0 to 10.

The moisture content of the aggregate may be below about 1.0 percent by weight. The moisture content of the aggregate may be below about 0.5 percent by weight. The moisture content of the aggregate may be nil.

In another embodiment, a method for maintaining a roadway is provided. The method includes: selecting a first composition and a second composition configured to react with each other and provide an epoxy-based binder system; and an aggregate for being disbursed into the binder system to provide a material; wherein the aggregate is selected according to moisture content and a desired strength for the material once cured; mixing the first composition, the second composition and the aggregate; and applying the material to the roadway.

BRIEF DESCRIPTION OF THE DRAWINGS

The features and advantages of the invention are apparent from the following description taken in conjunction with the accompanying drawings in which.

DETAILED DESCRIPTION OF THE INVENTION

Figure 1:
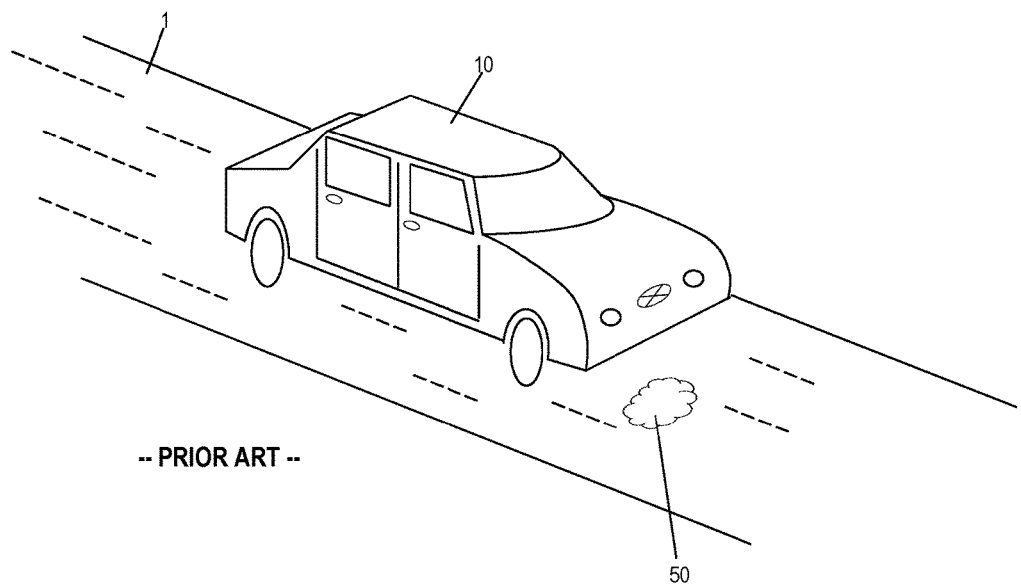
FIG. 1 is an schematic diagram depicting a vehicle traversing a roadway.

Disclosed herein are techniques that involve compositions, methods and apparatus that are generally directed to mixing an epoxy based binder system with aggregate material. The aggregate material may be selected according to moisture content and desired performance characteristics. Generally, the techniques provide a material that is based on an epoxy type of composition. The material has outstanding physical performance, thus enabling use for applications where other less desirable or poorly performing materials have been all that is available. As a result of the superior performance, greater durability and therefore reduced costs are achieved. In addition to providing superior performance characteristics, the materials may displace other more hazardous or noxious materials presently required for such applications.

Among other things, the compositions disclosed herein provide materials that exhibit outstanding performance for flexibility and elongation. Accordingly, the compositions are well suited for use in roadway repair and construction, as well as other applications requiring materials with the associated properties.

In order to provide some context, some terms are introduced.

As discussed herein, the term "aggregate" generally refers to materials such as sand, gravel, rock or crushed stone. Aggregate of varying size and composition is used with a binding agent to produce asphalt concrete or Portland cement concrete.

As discussed herein, the term "aggregate base" or "base" generally refers to a layer of material, usually quarried rock or recycled asphalt concrete that is laid on top of native soil or an aggregate subbase. Aggregate base provides a foundation to support a surface layer of asphalt, concrete or Portland cement concrete.

As discussed herein, the term "aggregate subbase" generally refers to a layer of evenly spread and compacted crushed stone laid on a base of native soil that provides the main load-bearing layer of a pavement, aids drainage and prevents settlement that leads to surface defects such as rutting.

As discussed herein, the term "asphalt" generally refers to a material obtained through petroleum processing that is a generic term for asphalt concrete. "Asphalt concrete" generally refers to a composite mix of aggregate and asphalt binder that is the most frequently used surface material for road and parking lot construction. "Blacktop" is a generic term for asphalt concrete. In at least some instances, these terms may be used interchangeably herein.

Asphalt, which is also known as "bitumen," is a sticky, black and highly viscous liquid or semi-solid form of petroleum. The components of asphalt are classified into four classes of compounds: a. saturates, saturated hydrocarbons, the % saturates correlates with softening point of the material; b. naphthene aromatics, consisting of partially hydrogenated polycyclic aromatic compounds; c. polar aromatics, consisting of high molecular weight phenols and carboxylic acids; and d. asphaltenes, consisting of high molecular weight phenols and heterocyclic compounds.

As discussed herein, the term "hot mix asphalt" generally refers to a high quality, temperature-controlled hot mixture of asphalt binder and aggregate, ranging from coarse to very fine particles. Hot mix asphalt can be compacted into a uniform and dense mass.

As discussed herein, the term "pavement" generally refers to a surface layer of a structural section of road that carries traffic. In typical modern roadways, construction of the pavement involves applying hot mix asphalt and compressing the hot mix asphalt with a roller to provide the uniform, dense mass.

As discussed herein, the term "pothole" generally refers to a bowl-shaped hole in pavement caused by water damage that may extend into the base. "Patch material" may be used to fill or maintain the pothole.

Refer to FIG. 1. where an exemplary embodiment of a roadway 1 is shown. In this example, the roadway 1 provides a surface upon which a vehicle 10 travels. (Note that the term vehicle may be used interchangeably with terms such as, "automobile," "car," "truck," and other similar terms). As shown in FIG. 1, pavement of the roadway 1 includes at least one pothole 50.

Figure 2:
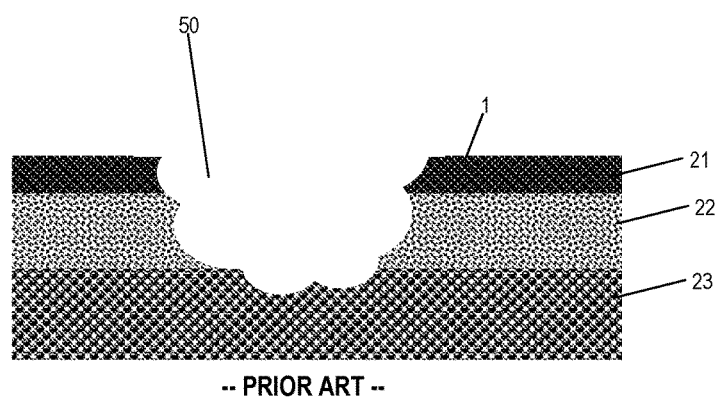
FIG. 2 is a cross-sectional view of a portion of the roadway of FIG. 1.

FIG. 2 depicts a cross-sectional portion of the roadway 1 depicted in FIG. 1. The portion includes pothole 50, and illustrates layers of pavement 21, aggregate base 22 and aggregate subbase 23. As shown in this example, the pothole 50 extends through the pavement 21, and aggregate base 22 and into the aggregate subbase 23. Of course, a given pothole 50 may involve greater or lesser portions of the roadway 1.

Generally, with regard to the layers within the roadway 1, the uppermost layer (i.e., the pavement 21) exhibits the lowest porosity, and porosity incrementally increases in subsequent downward positioned layers. Accordingly, the aggregate base 22 and the aggregate subbase 23 are configured to drain away water as best as possible while providing structural support. As one might imagine, the materials used in each layer therefore exhibit varying properties. Deviation from design configuration can greatly affect performance. For example, once the compressive force applied by the upper layers has been alleviated, and the aggregate subbase 23 is exposed to the environment, it may crumble and relocate with little force applied, thus causing the pothole 50 to expand rapidly.

As provided herein, the compositions of matter disclosed may be used to fill, patch or maintain the pothole 50, thus substantially restoring the roadway 1 to desired performance specifications.

Figure 3:
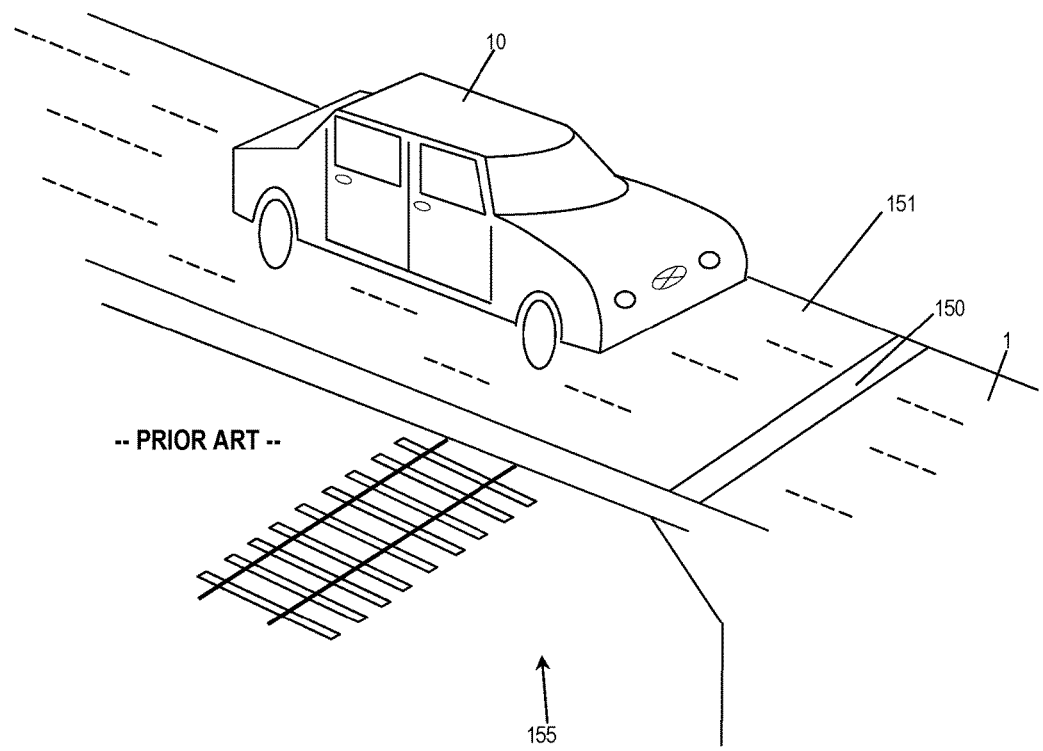
FIG. 3 is a schematic diagram depicting aspects of a bridge with the vehicle of FIG. 1 crossing thereover.

FIG. 3 depicts another exemplary embodiment of a roadway 1. In this example, the roadway 1 includes a bridge 155 with a span 151. The span 151 extends over topography such as a rail bed with rail road tracks. Thus, the span 151 is subject to thermal conditions that may vary from that of the roadway 1. In common bridge installations, a bridge header 150 that incorporates flexible material is included and accommodates thermal expansion processes. Generally, the bridge header 150 includes a volume of material that is configured to account for and absorb the effects of differing rates of thermal expansion and contraction as may arise between the span 151 and the roadway 1.

Thus, disclosed herein are techniques for maintaining a roadway 1, such as by patching potholes 50 or other defects and by providing for addition of features such as the bridge header 150. Generally, the compositions of matter provided herein includes an epoxy-based material mixed with aggregate. The compositions of matter are substantially insensitive to moisture, and exhibits a low susceptibility to predominant environmental conditions that cause degradation. As a matter of convention, and for purposes of explanation, when used for or suitably prepared for maintenance of the roadway 1, the compositions of matter disclosed herein are generally referred to as an "epoxy based aggregate material," and by other similar terms.

As an overview, and in some embodiments, the epoxy based aggregate material results from a composition of matter that includes a binder that is a two-part epoxy system which is mixed with treated aggregate. Treatment of the aggregate may involve drying of the aggregate to control the moisture content. The epoxy based aggregate material provides an excellent repair material for repair of defects in roadways. Once the epoxy based aggregate material has been applied, solidified (interchangeably used with "cured"), an improved repair is realized.

Exemplary embodiments of the two-part epoxy used as the binder system of the composition of matter are provided in Table I. The proportions provided are in weight percent, with the weight percent of each component as a fraction of the total weight. Generally, Part A is mixed with part B in approximately a 1:1 ratio (by volume) or in approximately a 0.939:1 ratio (by weight) to achieve a specific stoichiometric ratio.

TABLE I

Binder System

| Chemical name | Range (min-max) | |
|---|---|---|
| Part A | | |
| 4,4'-isopropylidenediphenol-epichlorohydrin copolymer | 60 | 80 |
| phenol-formaldehyde polymer glycidyl ether | 10 | 30 |
| monofunctional aliphatic epoxy reactive diluent | 5 | 15 |
| Part B | | |
| styrenated phenol | 35 | 60 |
| aminoethylpiperazine | 15 | 30 |
| aromatic diluent | 10 | 20 |
| naphtalene, bis(1-methylethyl)- | 5 | 15 |
| tertriary amine | 0 | 10 |
| aliphatic amine | 0 | 10 |

The monofunctional aliphatic epoxy reactive diluent may include at least one of: dodecyl glycidyl ether; butyl glycidyl ether; 2-ethyl hexyl glycidyl ether; neopentyl glycol glycidyl ether and combinations thereof as well as other similar diluents. The aromatic diluent may include at least one of: toluene, benzyl alcohol, xylene and combinations thereof as well as other similar aromatic diluents. The tertiary amine may include at least one of: 2,4,6-tris-(dimethylaminomethyl)phenol; trimethyl amine; triethanolamine and combinations thereof as well as other similar tertiary amines. The aliphatic amine may include at least one of: 2-aminoethanol; 2-methyl-1,5-pentamethylenediamine; methylamine and combinations thereof as well as other similar aliphatic amines.

Tests were performed to evaluate the proportions to get parts A:B in a 1:1 volumetric ratio. The tests were performed at seventy three degrees Fahrenheit, plus or minus three degrees. Data for the tests is set forth in Table II.

TABLE II-A

Proportions for A:B in a 1:1 volumetric ratio

| Component | Mass (g) | Parts | Volume (% of total) |
|---|---|---|---|
| Resin (Part A) | 300.0 | 100.0 | 51.57 |
| Hardener (Part B) | 281.7 | 93.9 | 48.43 |

TABLE II-B

Resin (Component A):

| Component | Volume (% of total) |
|---|---|
| Viscosity at 70 F., cps, RV2 at 10 rpm ASTM C2393 (E005) | 1400-1700 |
| Density at 70 F., g/cc ASTM C2393 (E005) | 1.13-1.16 |

TABLE II-C

Hardener (Component B):

| Component | Volume (% of total) |
|---|---|
| Viscosity at 70 F., cps, RV2 at 50 rpm ASTM C2393 (E005) | 450-800 |
| Density at 70 F., g/cc ASTM C2393 (E005) | 1.07-1.09 |

TABLE II-D

Mixed (Components A and B):

| Component | Volume (% of total) |
|---|---|
| Viscosity at 70 F., cps, RV2 at 20 rpm ASTM C2393 (E005) | 800-1200 |
| Gel Time @ 70 F., minutes (E006, mod. 100 g only of A + B) | 7-12 |
| Peak Exotherm, F. (E006, mod. 100 g only of A + B) | 220-250 |

The aggregate that is combined with the binder system may be qualified for moisture content prior to use. Through a series of evaluations, it has been shown that control of the moisture content can provide for substantial improvements in the compressive strength of a final product for use as the epoxy based aggregate material.

In order to evaluate the effects of moisture on the binder system, a study was performed. In the study, aggregate was conditioned (left sitting) in a laboratory for several weeks. Five samples were created, with each sample containing 1000 grams of the aggregate. Water was added to each of three of the samples to achieve moisture levels of dried aggregate, lab conditioned aggregate and samples of aggregate with 0.5 percent, 1.0 percent, and 1.5 percent moisture levels. Sample containers with added moister were sealed and shaken/mixed thoroughly. The samples were left sealed overnight to allow the proper homogeneity of the moisture in the samples. The dry aggregate sample was dried in an oven at 100 degrees Celsius overnight and then cooled down in a desiccator in order to determine any residual moisture in the "dry" lab conditioned aggregate.

The overnight drying of conditioned aggregate yielded loss of an additional 0.4 percent of moisture. Assuming substantial elimination of moisture, this means, the dry, lab conditioned aggregate contained approximately 0.4 percent moisture. Table III provides a correlation of the samples of aggregate.

TABLE III

Aggregate Samples

| Sample | *Moisture Content (% w) | Sample Preparation | Visual Condition |
|---|---|---|---|
| A | — | Dried overnight | visually dry |
| B | 0.5 | Dry lab conditioned | visually dry, the same appearance as A |
| C | 1.0 | Water addition | visually dry, but a bit darker than A and B |
| D | 1.5 | Water addition | looking wet, but not shiny wet |
| E | 2.0 | Water addition | visibly wet and water shiny |

*estimated moisture content values rounded off, account for inherent moisture content.

Specimens for compressive strength evaluations were prepared using above aggregates according to the requirements of ASTM C109 (ASTM C109 is a standard entitled "Standard Test Method for Compressive Strength of Hydraulic Cement Mortars" and published by ASTM International of West Conshohocken, Pa.). Applicable portions of this standard are incorporated herein by reference.

The specimens tested were formed by combining the binder system with one of the various samples of aggregate. The specimens were formed into cubes that were two inches along each edge. Each sample was cured for twenty four hours at room temperature, followed by an overnight post-cure heating cycle at 140 degrees Fahrenheit. The samples were cooled to seventy two degrees Fahrenheit for testing. Testing of the samples was conducted according to the ASTM C109 standard.

Figure 4:
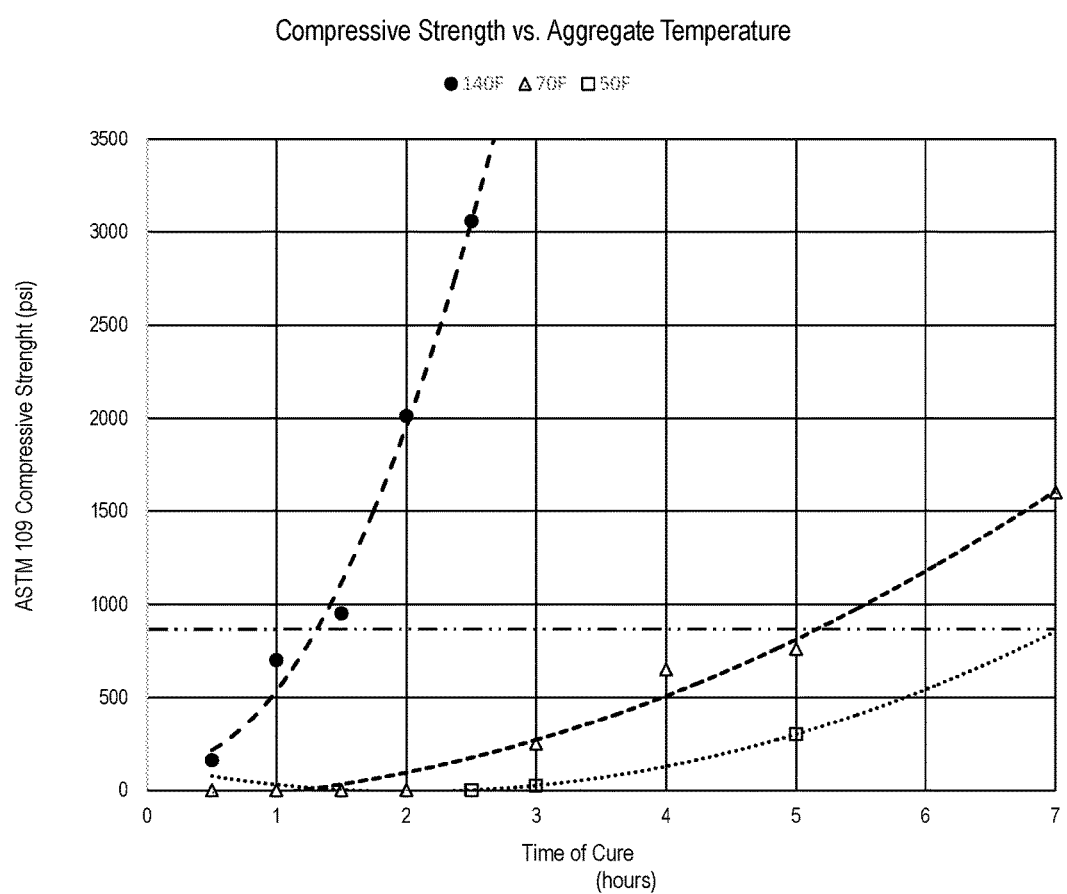
FIG. 4 is a graphic diagram depicting compressive strength versus temperature for a formulation according to the teachings herein.

The graph provided in FIG. 4 depicts compressive strength as a function of temperature for the aggregate. In this example, three different samples were evaluated. Aggregate with a temperature of about one hundred and forty degrees Fahrenheit, seventy degrees Fahrenheit and fifty degrees Fahrenheit. Curing time required to meet the ASTM 109 performance standard was evaluated. The greatest amount of curing time was needed for the sample held at about fifty degrees Fahrenheit (about seven hours). For the sample held at about seventy degrees Fahrenheit, the curing time required was about five hours. As may be seen in the graph, for the sample held at about one hundred and forty degrees Fahrenheit, the curing time required to meet the performance standard was substantially shortened and about 1.25 hours. Additionally, the sample held at about one hundred and forty degrees Fahrenheit showed a dramatic overall increase in compressive strength. It is not known whether the other samples would ultimately have reached the same level of performance, as the study did not take the extra time that might have been required to make that determination.

Figure 5:
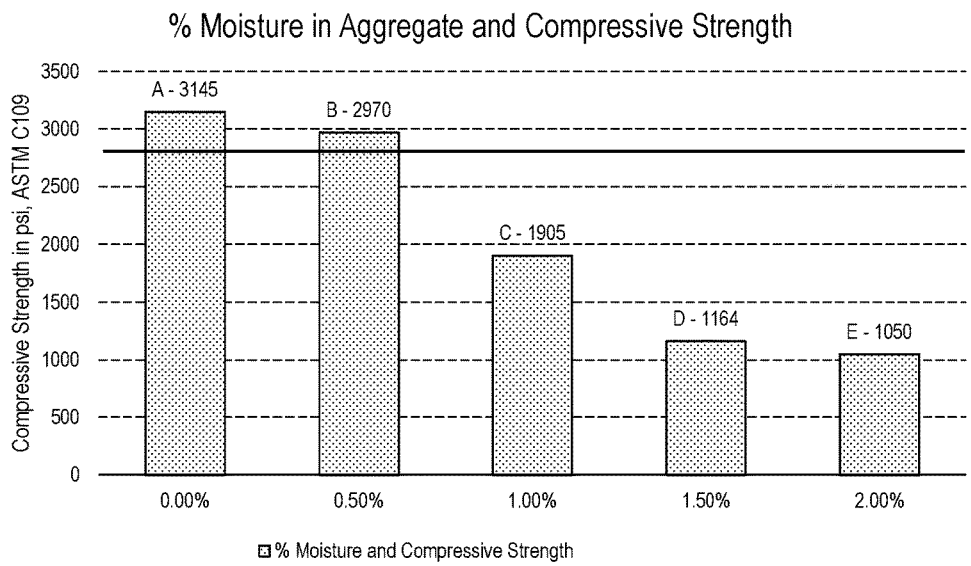
FIG. 5 is a graph comparing compressive strength as a function of moisture in aggregate.

The chart provided in FIG. 5 includes a summary of the results of the compressive strength testing for the epoxy based aggregate material. The histogram provided shows compressive strength results as a function of moisture level in aggregate. The horizontal line depicts a desired standard of performance at 2800 psi.

As the results show, moisture affects the compressive strength dramatically. The epoxy based aggregate material exhibited the greatest compressive strength (3145 psi) when the aggregate included insubstantial amounts of moisture (Sample A). Where the epoxy based aggregate material included aggregate with about one percent moisture, a substantial drop in compressive strength (about a thirty nine percent drop to 1905 psi) was realized. Testing showed that any additional water presence caused additional harm to the compressive strength and reduction in performance of the product.

Although epoxy does not react with water, it is suspected the moisture present in the aggregate might affect the adhesion to the curing epoxy liquids (integrity of the material) which could be seen in the compressive strength testing.

Given the improved performance resulting from use of dry aggregate, methods for preparation of the composition of matter may include drying the aggregate. That is, it is preferable that the surface of aggregate used is as dry as possible. Some techniques for drying the aggregate may include use of a blow torch. Heating aggregate with the blow torch may also result in increased temperature of the aggregate, thus accelerating curing reaction, and shortening the time required to adequately cure the composition of matter into a final product.

Aspects of an exemplary embodiment with additional test data are now provided.

In the exemplary embodiment, ⅜ inch crushed stone aggregate was used. The crushed stone aggregate was conditioned in the lab at room temperature and about thirty to forty percent relative humidity for few days. Measured residual moisture in the aggregate was around 0.4 percent, which is considered dry, but not kiln dry.

Evaluations of tensile and elongation strength of the epoxy based aggregate material were conducted. Specimens were prepared by mixing Part A and Part B of the binding system with no aggregate, and flooding the glass mold with a ⅛ inch gap. The samples were cured for twenty four hours at room temperature, demolded. This was followed by an overnight post-cure heating cycle at 140 degrees Fahrenheit. The samples were cooled to between about seventy degrees to seventy two degrees Fahrenheit for testing. Testing was performed according to standards ASTM D-638 (for elongation) and ASTM-D-412 (for tensile strength). Applicable portions of these standards are incorporated herein by reference.

Evaluations of compressive strength of the epoxy based aggregate material were also conducted. Specimens were formed into cubes that were two inches along each edge. Each sample was cured for twenty four hours at room temperature, followed by an overnight post-cure heating cycle at 140 degrees Fahrenheit. The samples were cooled to between about seventy to seventy two degrees Fahrenheit for testing. Testing of the samples was conducted according to the ASTM C109 standard. Three samples of each batch were tested. Test data is provided in the Table IV.

TABLE IV-A

Viscosity of Uncured Binder System
TEST DATA FOR UNCURED PRODUCT

| Viscosity (at 74 degrees Fahrenheit) (ASTM 2393) | Part A | Part B |
|---|---|---|
|  | 560 cps | 1575 cps |
|  | 570 cps | 1475 cps |
|  | 580 cps | 1550 cps |
| Average | 570 cps | 1533 cps |

| Viscosity (at 70 degrees Fahrenheit) (ASTM 2393) | Part A | Part B |
|---|---|---|
|  | 780 cps | 1850 cps |
|  | 770 cps | 2075 cps |
|  | 770 cps | 2125 cps |
| Average | 773 cps | 2116 cps |

TABLE IV-B

Gel Time for Binder System
TEST DATA FOR MIXED PARTS

| Combination | Gel Time (minutes) (E006) | Comment |
|---|---|---|
| Part A, Part B | 10 | 100 gram sample, 270 degrees Farhenheit |
| Part A, Part B | 10 | 215 gram sample, 270 degrees Farhenheit |
| Part A, Part B, 0.4% moisture ⅜" aggregate | 38 | 124 degrees Farhenheit |

TABLE IV-C

Tensile Strength of Cured Product
TEST DATA OF CURED PRODUCT

| Tensile Strength (ASTM D412) | Load (lbf) | Area (sq. inches) |
|---|---|---|
| 1 | 64.0 | 0.0313 |
| 2 | 62.9 | 0.0313 |
| 3 | 58.4 | 0.0313 |
| 4 | 55.0 | 0.0313 |
| 5 | 49.7 | 0.0313 |
| Average | 58.0/1856 psi | |

TABLE IV-D

Elongation at Break Point of Cured Product
TEST DATA OF CURED PRODUCT

| Elongation at break (ASTM D638) | Strain (inch) | Original size (inches) |
|---|---|---|
| 1 | 2.214 | 1.25 |
| 2 | 2.063 | 1.25 |
| 3 | 2.174 | 1.25 |
| 4 | 2.113 | 1.25 |
| 5 | 2.117 | 1.25 |
| Average | 2.136/171 % | |

TABLE IV-E

Compressive Strength of Cured Product
TEST DATA OF CURED PRODUCT

| Compressive Strength | Load (psi) |
|---|---|
| 1 | 3299 |
| 2 | 3509 |
| Average | 3404 |

Table V provides data showing comparative performance of an embodiment of the composition of matter that has been prepared as the epoxy based aggregate material suited for roadway usage.

TABLE V

Comparative Performance

| Product | Tensile Strength | Elongation at break (%) | Cure time |
|---|---|---|---|
| SIKADUR 51 NS | 650 psi | 80 | 14 days |
| MASTERSEAL CR 190 | 655 psi | 75 | 24 hours |
| Epoxy based aggregate material as disclosed | 1856 psi | 171 | 7 days |

The comparative samples include competitive use products. SIKADUR 51 NS is marketed as a flexible epoxy control-joint sealer/adhesive. SIKADUR 51 NS is available from Sika Corporation of Lyndhurst, N.J. MASTERSEAL CR 190 is marketed as a two-part flexible epoxy joint filler. MASTERSEAL CR 190 is available from Master Builders Solutions by BASF in Shakopee, Minn.

As may be seen from Table V, compositions of matter prepared as the epoxy based aggregate material suited for roadway applications exhibit far superior tensile strength, elongation, and cure times.

Figure 6:
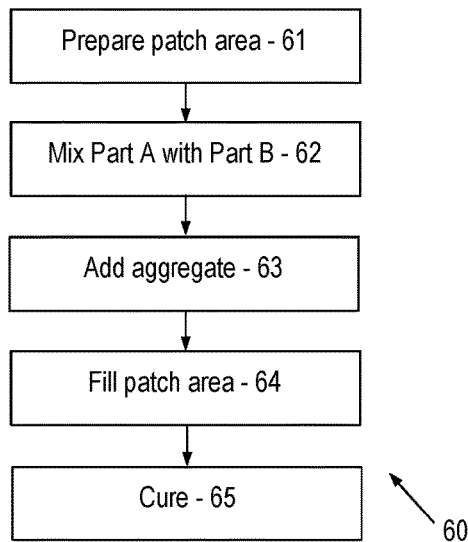
FIG. 6 is a flow chart depicting an exemplary embodiment of a method for applying patch material.

FIG. 6 is a flow chart that depicts an exemplary method for applying patch material 60 disclosed herein. In the method for applying patch material 60, a first step 61 a patch area such as a pothole is prepared. Preparation may involve, for example, removal of all loose debris and dewatering. In a second step 62, mixing Part A components with Part B components to provide the binder system. In a third step 63, a suitable aggregate is mixed with the binder system to provide the patch material. In a fourth step 64, the patch material is poured into the patch area. In a fifth step 65, the patch material is cured. Curing of the patch material may involve additional steps such as heating the patch material. In some embodiments, a steel plate is laid over the patch area filled with patch material to support traffic while the patch material cures. Once cured, the steel plate may be removed.

Suitable forms of aggregate include stone that is about ⅜ of an inch in diameter. In some embodiments, the stone may range from about one quarter of an inch to about half an inch in diameter. In some other embodiments, larger and/or smaller sizes are used. In some further embodiments, a mixture of stone sizes is used as the aggregate.

Having thus introduced embodiments of a system for patching roadways, some additional aspects are now presented.

The compositions disclosed herein are useful for replacing prior art materials such as formulations of methyl mecrylate, polyurethane, polyuria, silicone based compositions, asphalt, cement, and others as may be traditionally used.

The compositions disclosed herein may be used for a variety of applications. For example, in roadway applications, the compositions may be used in: expansion joint and bridge header reconstruction; as a control joint filler; for repair of cracks, potholes, and spalls; to resurface walkways; and in floors and bridge deck overlays.

Generally, no priming is required to bond to concrete, asphalt, steel or wood. The compositions result in a waterproof, chemically resistant installation that protects substrates from freeze-thaw spalling. The composition stops corrosion of any underlying reinforcing steel as the steel becomes is sealed from external moisture. The compositions may become solid (early curing) in as little as about sixty seconds. The compositions may be traffic ready in as little as about ten minutes, but are generally dependent upon air and substrate temperature.

Advantageously, preparation produces little odor, and the fumes during application exhibit low toxicity. This permits users to make repairs, resurface pavements, and apply protective coating year round, whether the ambient environment is hot or cold.

Various other components may be included and called upon for providing for aspects of the teachings herein. For example, additional materials, combinations of materials and/or omission of materials may be used to provide for added embodiments that are within the scope of the teachings herein.

A variety of modifications of the teachings herein may be realized. Generally, modifications may be designed according to the needs of a user, designer, manufacturer or other similarly interested party. The modifications may be intended to meet a particular standard of performance considered important by that party.

When introducing elements of the present invention or the embodiment(s) thereof, the articles "a," "an," and "the" are intended to mean that there are one or more of the elements. Similarly, the adjective "another," when used to introduce an element, is intended to mean one or more elements. The terms "including" and "having" are intended to be inclusive such that there may be additional elements other than the listed elements. As used herein, the term "exemplary" is not intended to imply a superlative example. Rather, "exemplary" refers to an embodiment that is one of many possible embodiments.

While the invention has been described with reference to exemplary embodiments, it will be understood by those skilled in the art that various changes may be made and equivalents may be substituted for elements thereof without departing from the scope of the invention. In addition, many modifications will be appreciated by those skilled in the art to adapt a particular instrument, situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. A composition of matter comprising:
   a first composition and a second composition configured to react with each other and provide an epoxy-based binder system; and
   aggregate for being disbursed into the binder system to provide a material;
   wherein a moisture content of the aggregate is controlled according to a desired strength for cured material; and
   wherein the second composition comprises at least one of: Styrenated Phenol; Aminoethylpiperazine; at least one aromatic diluent; Naphtalene, bis(1-methylethyl)-; at least one tertiary amine in a weight percent provided in range of between 0.01 to 10; and at least one aliphatic amine.

2. The composition of matter as in claim 1, wherein the first composition comprises: 4,4'-Isopropylidenediphenol-Epichlorohydrin Copolymer; Phenol-Formaldehyde Polymer Glycidyl Ether; and a monofunctional aliphatic epoxy reactive diluent.

3. The composition of matter as in claim 2, wherein the monofunctional aliphatic epoxy reactive diluent comprises at least one of: dodecyl glycidyl ether; butyl glycidyl ether; 2-ethyl hexyl glycidyl ether; neopentyl glycol glycidyl ether.

4. The composition of matter as in claim 2, wherein the weight percent of 4,4'-isopropylidenediphenol-epichlorohydrin copolymer is provided in range of between 60 to 80.

5. The composition of matter as in claim 2, wherein the weight percent of phenol-formaldehyde polymer glycidyl ether is provided in range of between 10 to 30.

6. The composition of matter as in claim 2, wherein the weight percent of the monofunctional aliphatic epoxy reactive diluent is provided in range of between 5 to 15.

7. The composition of matter as in claim 1, wherein the weight percent of styrenated phenol is provided in range of between 35 to 60.

8. The composition of matter as in claim 1, wherein the weight percent of aminoethylpiperazine is provided in range of between 15 to 30.

9. The composition of matter as in claim 1, wherein the weight percent of the at least one aromatic diluent is provided in range of between 10 to 20.

10. The composition of matter as in claim 1, wherein the weight percent of naphtalene, bis(1-methylethyl)- is provided in range of between 5 to 15.

11. The composition of matter as in claim 1, wherein the weight percent of aliphatic amine is provided in range of between 0.01 to 10.

12. The composition of matter as in claim 1, wherein the aromatic diluent comprises at least one of: toluene, benzyl alcohol and xylene.

13. The composition of matter as in claim 1, wherein the tertiary amine comprises at least one of: 2,4,6-tris-(dimethylaminomethyl)phenol; trimethyl amine and triethanolamine.

14. The composition of matter as in claim 1, wherein the aliphatic amine comprises at least one of: 2-aminoethanol; 2-methyl-1,5-pentamethylenediamine and methylamine.

15. The composition of matter as in claim 1, wherein the moisture content of the aggregate is below about 1.0 percent by weight.

16. The composition of matter as in claim 1, wherein the moisture content of the aggregate is below about 0.5 percent by weight.

17. The composition of matter as in claim 1, wherein the moisture content of the aggregate is nil.

18. The composition of matter as in claim 1, wherein the tensile strength of the cured material is a minimum of 700 psi.

19. The composition of matter as in claim 1, wherein the tensile strength of the cured material is a minimum of 1,000 psi.

20. The composition of matter as in claim 1, wherein the tensile strength of the cured material is a minimum of 1,500 psi.

21. The composition of matter as in claim 1, wherein the tensile strength of the cured material is up to 1,856 psi.

22. The composition of matter as in claim 1, wherein the elongation of the cured material at break is at least 80 percent of an original length.

23. The composition of matter as in claim 1, wherein the elongation of the cured material at break is at least 125 percent of an original length.

24. The composition of matter as in claim 1, wherein the elongation of the cured material at break is at least 150 percent of an original length.

25. The composition of matter as in claim 1, wherein the elongation of the cured material at break is up to 171 percent of an original length.

26. A composition of matter comprising:
   a first composition and a second composition configured to react with each other and provide an epoxy-based binder system; and
   aggregate for being disbursed into the binder system to provide a material;
   wherein a moisture content of the aggregate is controlled according to a desired strength for cured material; and
   wherein the second composition comprises at least one of: Styrenated Phenol; Aminoethylpiperazine; at least one aromatic diluent; Naphtalene, bis(1-methylethyl)-; and at least one aliphatic amine.

27. The composition of matter as in claim 26, wherein the weight percent of aliphatic amine is provided in range of between 0.01 to 10.

28. The composition of matter as in claim 26, further comprising a tertiary amine provided in a weight percent range of between 0.01 to 10.

\* \* \* \* \*